US012647245B2

(12) United States Patent　　　　　(10) Patent No.: US 12,647,245 B2
　Lam　　　　　　　　　　　　　　　　　(45) Date of Patent:　　　Jun. 2, 2026

(54) METHOD OF TRANSMITTING DATA VIA A SERIAL COMMUNICATION LINE AND A SERIAL COMMUNICATION DEVICE

(71) Applicant: Mo Kin Lam, Hong Kong (HK)

(72) Inventor: Mo Kin Lam, Hong Kong (HK)

( * ) Notice: Subject to any disclaimer, the term of this patent is extended or adjusted under 35 U.S.C. 154(b) by 109 days.

(21) Appl. No.: 18/815,886

(22) Filed: Aug. 27, 2024

(65) Prior Publication Data

US 2026/0012325 A1　　Jan. 8, 2026

(30) Foreign Application Priority Data

Jul. 2, 2024　(CN) ........................ 202410880898.X

(51) Int. Cl.
H04L 7/04　　　　(2006.01)
(52) U.S. Cl.
CPC ..................................... H04L 7/04 (2013.01)
(58) Field of Classification Search
CPC ......................................................... H04L 7/04
See application file for complete search history.

(56) References Cited

U.S. PATENT DOCUMENTS 4,012,712 A　　3/1977　Nelligan
8,165,115 B2 *　4/2012　Choi ....................... H04L 49/90
　　　　　　　　　　　　　　　　710/316

10,033,838 B2 *　7/2018　Parkin ..................... G06F 13/40
12,348,607 B2 *　7/2025　Anzil ................... H04B 7/0691
2002/0027558 A1　3/2002　Osa
2017/0077949 A1　3/2017　Wheeler et al.
2025/0119236 A1 *　4/2025　Youm ..................... H03M 9/00

FOREIGN PATENT DOCUMENTS

CN　　117520259 A　　2/2024
CN　　117938316 A　　4/2024

OTHER PUBLICATIONS

European Search Report of European Patent Application No. 24196800.7 issued on Jan. 24, 2025.

* cited by examiner

*Primary Examiner* — Dac V Ha

(57)　　　　　　ABSTRACT

A method of transmitting data via a serial communication line and a serial communication device are disclosed. The method of transmitting data via a serial communication line includes: generating a signal to be transmitted based on a predetermined serial communication protocol, and transmitting the data through the signal to be transmitted via the serial communication line; wherein the signal to be transmitted includes a start symbol, an end symbol, and a data frame of the data to be transmitted, the data frame is a variable-length byte frame, for each byte data, if the byte data is a positive numerical value, the variable-length byte frame is generated by omitting all bits 0 before a first bit 1 of a binary equivalent of the positive numerical value.

18 Claims, 6 Drawing Sheets

| Single-byte transmission | | Frame symbol | Transmission waveform |
|---|---|---|---|
| UART | 0 | | |
| Present invention | 0 | | |
| UART | 1 | | |
| Present invention | 1 | | |
| UART | -1 | | |
| Present invention | -1 | | |
| UART | 2 | | |
| Present invention | 2 | | |
| UART | 4 | | |
| Present invention | 4 | | |
| UART | -4 | | |
| Present invention | -4 | | |
| UART | 255 | | |
| Present invention | 255 | | |
| UART | -255 | | |
| Present invention | -255 | | |

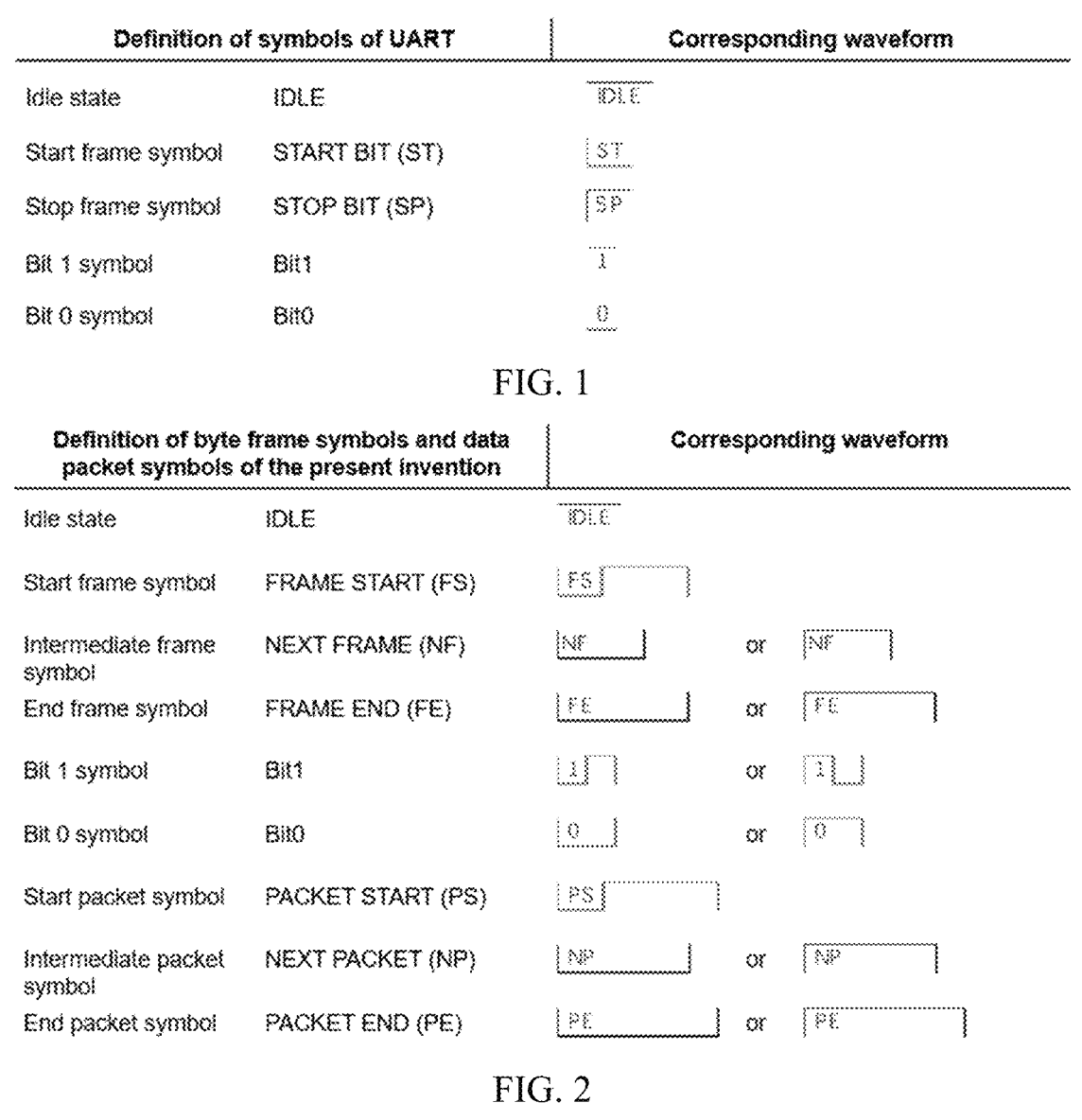

| Definition of symbols of UART | | Corresponding waveform |
| --- | --- | --- |
| Idle state | IDLE | IDLE |
| Start frame symbol | START BIT (ST) | ST |
| Stop frame symbol | STOP BIT (SP) | SP |
| Bit 1 symbol | Bit1 | 1 |
| Bit 0 symbol | Bit0 | 0 |

FIG. 1

| Definition of byte frame symbols and data packet symbols of the present invention | | Corresponding waveform | | |
| --- | --- | --- | --- | --- |
| Idle state | IDLE | IDLE | | |
| Start frame symbol | FRAME START (FS) | FS | | |
| Intermediate frame symbol | NEXT FRAME (NF) | NF | or | NF |
| End frame symbol | FRAME END (FE) | FE | or | FE |
| Bit 1 symbol | Bit1 | 1 | or | 1 |
| Bit 0 symbol | Bit0 | 0 | or | 0 |
| Start packet symbol | PACKET START (PS) | PS | | |
| Intermediate packet symbol | NEXT PACKET (NP) | NP | or | NP |
| End packet symbol | PACKET END (PE) | PE | or | PE |

FIG. 2

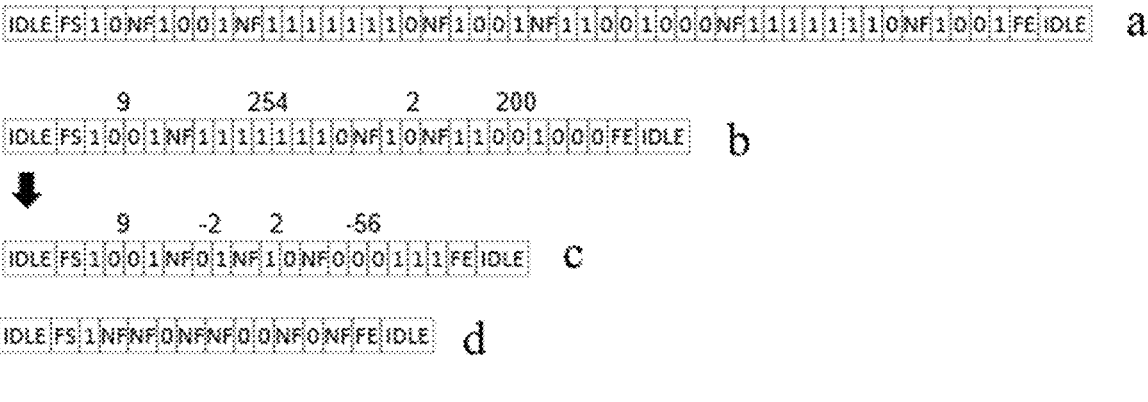

FIG. 7

Generating a signal to be transmitted based on a predetermined serial communication protocol Transmitting the data through the signal to be transmitted via the serial communication line; the signal to be transmitted includes a start symbol, an end symbol, and a data frame of the data to be transmitted, the data frame is a variable-length byte frame, for each byte data, if the byte data is a positive numerical value, the variable-length byte frame is generated by omitting all bits 0 before a first bit 1 of a binary equivalent of the positive numerical value

FIG. 8

METHOD OF TRANSMITTING DATA VIA A SERIAL COMMUNICATION LINE AND A SERIAL COMMUNICATION DEVICE

CROSS REFERENCE TO RELATED APPLICATIONS

The present application claims the benefit of Chinese Patent Application No. 202410880898.X filed on Jul. 2, 2024, the contents of which are incorporated herein by reference in their entirety.

TECHNICAL FIELD

The present disclosure relates to the field of communications, and in particular to a method of transmitting data via a serial communication line and a serial communication device.

BACKGROUND TECHNOLOGY

Traditional serial communication technologies such as UART (Universal Asynchronous Receiver/Transmitter)/SPI (Serial Peripheral Interface)/I2C (Inter-Integrated Circuit) use fixed-length byte frames for communication. Although they are simple and easy to use, they cannot omit the transmission of non-essential bits, cannot transmit byte frames that are mixed with positive and negative numerical data/command/address, and cannot transmit data packets without interruption. The present disclosure is dedicated to solve these problems.

SUMMARY OF THE INVENTION

According to one aspect of the present disclosure, a method of transmitting data via a serial communication line is provided, the method includes: generating a signal to be transmitted based on a predetermined serial communication protocol, and transmitting the data through the signal to be transmitted via the serial communication line; wherein the signal to be transmitted includes a start symbol, an end symbol, and a data frame of the data to be transmitted, the data frame is a variable-length byte frame, for each byte data, if the byte data is a positive numerical value, the variable-length byte frame is generated by omitting all bits 0 before a first bit 1 of a binary equivalent of the positive numerical value.

In some embodiments of the present disclosure, if the byte data is 0, the variable-length byte frame is a null bit; if the byte data is a negative numerical value, the variable-length byte frame is obtained by inverting each bit of the variable-length byte frame of the positive numerical value that corresponds to the negative numerical value.

In some embodiments of the present disclosure, the method further includes: when transmitting continuous byte data, inserting an intermediate frame symbol between two adjacent variable-length byte frames corresponding to the byte data.

In some embodiments of the present disclosure, the start symbol includes a start frame symbol and a start packet symbol, the end symbol includes an end frame symbol and an end packet symbol, the signal to be transmitted is transmitted in a frame transmission mode or a packet transmission mode based on the start frame symbol and the start packet symbol respectively.

In some embodiments of the present disclosure, the method further includes: when transmitting continuous data packets, inserting an intermediate packet symbol between two adjacent data packets.

In some embodiments of the present disclosure, based on the predetermined serial communication protocol, a transmission waveform of bit 1 is bi-level, each level with a pulse width of one unit, and a transmission waveform of bit 0 is single-level with a pulse width of two units, a transmission waveform of the start frame symbol is bi-level with a pulse width of one unit and a pulse width of three units respectively, a transmission waveform of the intermediate frame symbol is single-level with a pulse width of three units, a transmission waveform of the end frame symbol is single-level with a pulse width of four units, a transmission waveform of the start packet symbol is bi-level with a pulse width of one unit and a pulse width of four units respectively, a transmission waveform of the intermediate packet symbol is single-level with a pulse width of four units, and a transmission waveform of the end packet symbol is single-level with a pulse width of five units.

In some embodiments of the present disclosure, the serial communication line includes a plurality of serial communication lines, the data to be transmitted are assigned to the plurality of serial communication lines and sent in parallel.

In some embodiments of the present disclosure, the method further includes: performing byte encoding on each byte data, wherein the byte encoding includes a first part and a second part following the first part, the second part is a bit representation value of the byte data, the first part has a fixed bit length, and a value of the first part represents a bit length of the bit representation value in the second part.

In some embodiments of the present disclosure, the method further includes: counting a number of occurrences of each byte in an input byte group, according to a predefined principle, transmitting each byte in the input byte group represented by the variable-length byte frame, wherein the predefined principle is that the greater the number of occurrences of the byte, the shorter a length of the variable-length byte frame that represents the byte.

According to another aspect of the present disclosure, a serial communication device is provided, the serial communication device includes a serial communication interface, and the serial communication interface transmits data using any one of the above methods.

The present disclosure can improve the overall data transmission speed and efficiency.

BRIEF DESCRIPTION OF THE DRAWINGS

FIG. 1 shows the definition of frame symbols of the conventional UART serial port technology.

FIG. 2 shows the definition of frame/packet symbols of the variable byte length serial communication system of an embodiment of the present disclosure.

FIG. 7 shows an example of compression transmission of an embodiment of the present disclosure.

FIG. 8 shows a method of transmitting data via a serial communication line of an embodiment of the present disclosure.

DETAILED EMBODIMENTS

Figures 3, 4A, 4B:
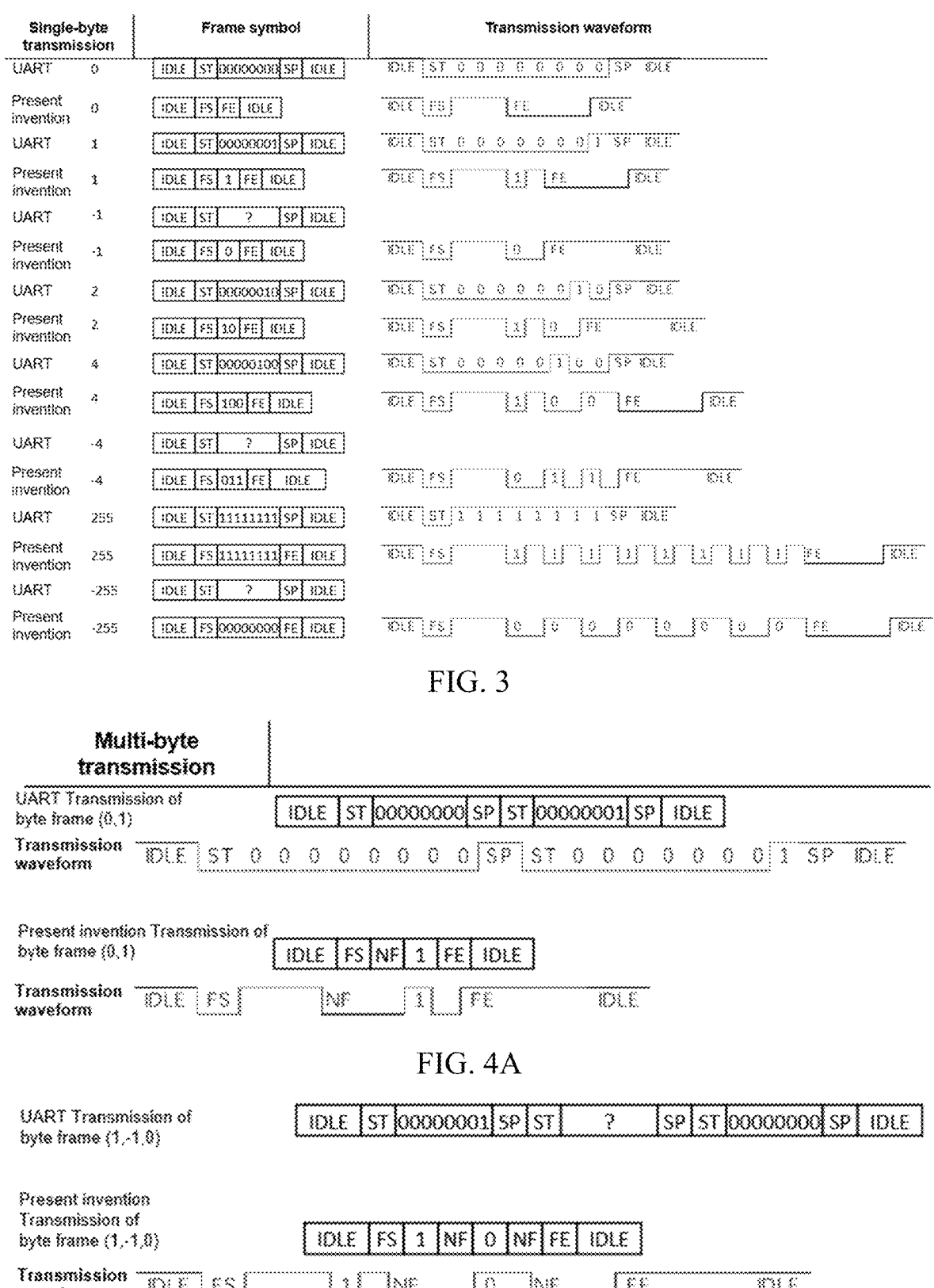
FIG. 3 shows a comparison of examples of single frame transmission of the conventional UART serial port and the variable byte length serial port of an embodiment of the present disclosure.
FIGS. 4A-B show a comparison of examples of multi-frame transmission of the conventional UART serial port and the variable byte length serial port of an embodiment of the present disclosure.

As mentioned above, conventional serial communication technologies such as UART/SPI/I2C have the following disadvantages:

1. Only fixed-length byte frames can be transmitted, and the transmission of unnecessary "0" bits cannot be omitted;
2. The byte frames of positive and negative numerical data/command/address cannot be mixed and transmitted without interruption within the specified byte length;
3. Data packets cannot be transmitted without interruption.

The above shortcomings of the conventional serial communication technology make it particularly unsuitable for LCD (Liquid Crystal Display) display drivers. For example, in LCD display drivers, in order to increase the screen display speed, it is expected to achieve mixed and uninterrupted transmission of data/command byte frames. For another example, when transmitting images, and when only the differential information of the image data is transmitted to accelerate the speed, it is necessary to transmit positive and negative integers at the same time. Conventional serial communication technology cannot solve these problems very well.

In some embodiments of the present disclosure, a serial communication method and system with variable byte length are used, non-essential "0" bits in the high order of the data bytes are omitted when transmitting data, and byte frames or data packets mixed with positive and negative numerical data/command/address can be transmitted without interruption. This can solve the above-mentioned problems very well. It can improve the overall data transmission speed and efficiency, and is particularly suitable for devices, such as serial LCD display drivers, that need to transmit byte frames with positive and negative numerical data/command/address.

In some embodiments of the present disclosure, a single-wire can be used to connect a sender and a receiver for communication. The sender arranges the data to be transmitted according to the bit arrangement described in the embodiment of the present disclosure, and transmits the data to the receiver according to the serial communication protocol described in the embodiment of the present disclosure; the receiver detects the transmission mode and transmission speed of the sender from the received start symbol, decodes the variable-length byte frames according to the transmission mode and transmission speed consistent with the sender, and recovers the correct data.

In some embodiments of the present disclosure, a variable byte length serial communication method and system can utilize a single pin for self-synchronous transmission, and can implement all related functions by software or hardware; these functions improve the overall data transmission efficiency and speed as compared to existing communication serial ports such as UART/SPI/I2C, especially for devices that require uninterrupted transmission of byte frames of mixed positive and negative numerical data/command/address, such as a serial LCD display screen driver, and it can effectively improve the display speed of serial LCD display screens.

In some embodiments of the present disclosure, whether implemented through software or hardware, it can utilize IP (Intellectual Property) licensing to integrate into existing software in the industry, or various hardware processors and hardware connection interface IC (Integrated Circuit) as a universal data communication serial port, and it can also be used as a special communication serial port for a serial LCD display driver.

For example, in some embodiments of the present disclosure, software can be used to simulate the serial communication method and system described in the embodiments of the present disclosure, for example, in an MCU (Microcontroller Unit), a single ordinary GPIO (General-Purpose Input/Output) pin can be used to connect the sender and the receiver, and the self-synchronous serial communication protocol described in the embodiment of the present disclosure is run on it by programming so as to perform continuous byte frames or data packets communication between the sender and the receiver.

Further, in some embodiments of the present disclosure, FPGA (Field Programmable Gate Array) technology can also be used to implement the self-synchronous serial communication method and system described in the embodiments of the present disclosure; running the present disclosure in FPGA can increase the clock rate, achieve a higher communication speed and convenience than software simulation, and reduce the complexity and power consumption of software simulation.

Also, in some embodiments of the present disclosure, IC design technology can also be utilized, which can achieve higher clock rate, smaller size, and lower power consumption than FPGA; similar to UART/SPI/I2C, it can also be integrated into various processors and communication interface IC as a universal single-wire self-synchronous serial communication interface.

The present disclosure will be described in detail below with reference to FIGS. 1-9.

FIG. 1 shows the definition of frame symbols of the conventional UART serial port technology, wherein the widths of the UART frame symbols are defined as follows:

Assuming that the minimum pulse width (i.e., unit pulse width) is 1T, then the pulse widths of the start frame symbol ST, the end frame symbol SP, the bit 1 symbol, and the bit 0 symbol are all 1T.

FIG. 2 shows the definition of the frame/packet symbols of the variable byte length serial communication system of an embodiment of the present disclosure, wherein, assuming that the unit pulse width is 1T, then the width of each symbol is defined in the following table:

| Symbol | Symbol Width |
| --- | --- |
| IDLE | >=2T |
| Start frame symbol FS | (1T, 3T), i.e., in a bi-level, a front level (low level in FIG. 2) occupies a pulse width of one unit, and a subsequent level (high level in FIG. 2) occupies a pulse width of three units |
| Intermediate frame symbol NF | 3T, i.e., a single-level occupies a pulse width of three units |

5                                                                 6

-continued

| Symbol | Symbol Width |
|--------|--------------|
| End frame symbol FE | 4T, i.e., a single-level occupies a pulse width of four units |
| Bit 1 symbol | (1T, 1T), i.e., in a bi-level, a front level and a subsequent level both occupy a pulse width of one unit |
| Bit 0 symbol | 2T, i.e., a single-level occupies a pulse width of two units |
| Start packet symbol PS | (1T, 4T), i.e., in a bi-level, a front level (low level in FIG. 2) occupies a pulse width of one unit, and a subsequent level (high level in FIG. 2) occupies a pulse width of four units |
| Intermediate packet symbol NP | 4T, i.e., a single-level occupies a pulse width of four units |
| End packet symbol PE | 5T, i.e., a single-level occupies a pulse width of five units |

FIG. 3 shows a comparison of examples of single frame transmission of a conventional UART serial port and a variable byte length serial port of an embodiment of the present disclosure. It can be seen that the 8-bit byte value transmitted via the UART serial port includes 0, 1, 2, 4, and 255, the byte length is fixed at 8 bits; while for the same value, the 8-bit byte transmitted via the serial port of the embodiment of the present disclosure has a variable length, which is 0 (0 bit), 1 (1 bit), 2 (2 bits), 4 (3 bits), and 255 (8 bits). That is to say, the data frame in the embodiment of the present disclosure is a variable-length byte frame. For each byte data, if the byte data is 0, the variable-length byte frame is a null bit (from the transmission waveform of the single byte "0" in FIG. 3, it only contains a transmission waveform of the start frame symbol and the end frame symbol, and there is no transmission waveform of the data frame, but in fact it represents that the transmission data is "0", i.e., the length of the variable-length byte frame is 0). If the byte data is a positive numerical value, the variable-length byte frame is generated by omitting all bits 0 before the first bit 1 of a binary equivalent of the positive numerical value. For example, for numerical value 1, UART needs to transmit 00000001, but the embodiment of the present disclosure omits the bits 0 before bit 1, i.e., the byte frame becomes 1; and for the binary equivalent 00000010 of numerical value 2, the embodiment of the present disclosure omits the bits 0 before bit 1, and the byte frame becomes 10.

It can also be seen from FIG. 3 that UART cannot transmit negative numerical values, such as −1, −4, and −255 in FIG. 3.

In contrast, the serial port of the embodiment of the present disclosure can transmit negative numerical values. In the examples of FIG. 3, the method for processing negative numerical values is: define the negative numerical value as the complement of its positive numerical value (i.e., bit 0 becomes 1, and bit 1 becomes 0). In other words, the variable-length byte frame of the negative numerical value is obtained by inverting each bit of the corresponding variable-length byte frame of the positive numerical value. For example, the bit strings corresponding to the positive numerical values 1, 4, and 255 are 1, 100, and 11111111, respectively; then the bit strings corresponding to the negative numerical values −1, −4, and −255 are 0, 011, and 00000000 respectively (i.e., each bit of the above three bit strings is inverted, bit 0 becomes 1, and bit 1 becomes 0). Of course, negative numerical values can also be processed in other ways. For example, the user can define the numerical value as a command/address.

The byte in the examples of FIG. 3 is an 8-bit byte. It is understood that the byte can also be extended to any bit number such as 16-bit/24-bit/32-bit; the larger the bit number, the higher the efficiency and speed of serial transmission in the embodiments of the present disclosure.

FIGS. 4A and 4B show a comparison of examples of multi-frame transmission of the conventional UART serial port and the variable byte length serial port of an embodiment of the present disclosure.

In the example of FIG. 4A, UART continuously transmits 2 bytes (0, 1), which are transmitted with a fixed bit length, the start and end frame symbols ST and SP need to be added in each byte frame. In contrast, when the embodiment of the present disclosure continuously transmits 2 bytes (0, 1), the transmission of byte 0 is omitted, and when byte 1 needs to be transmitted subsequently, an intermediate frame symbol NF is inserted, and the start frame and end frame symbols FS and FE are added only at the beginning and end of a multi-byte transmission, respectively, without the need to insert the start and end frame symbols between the multi-bytes as in UART.

In the example of FIG. 4B, it can be seen that UART cannot transmit mixed positive and negative numerical values, such as (1, −1, 0). In contrast, the embodiment of the present disclosure can transmit mixed positive and negative numerical values, such as (1, −1, 0). That is, after the start frame FS, byte 1 is transmitted; then, an intermediate frame NF is inserted, and the complement of byte −1 is transmitted; then, an intermediate frame NF is inserted again, and byte 0 does not need to be transmitted, after the byte transmission is completed, the end frame FE is transmitted, and then the IDLE state is returned.

Figure 5:
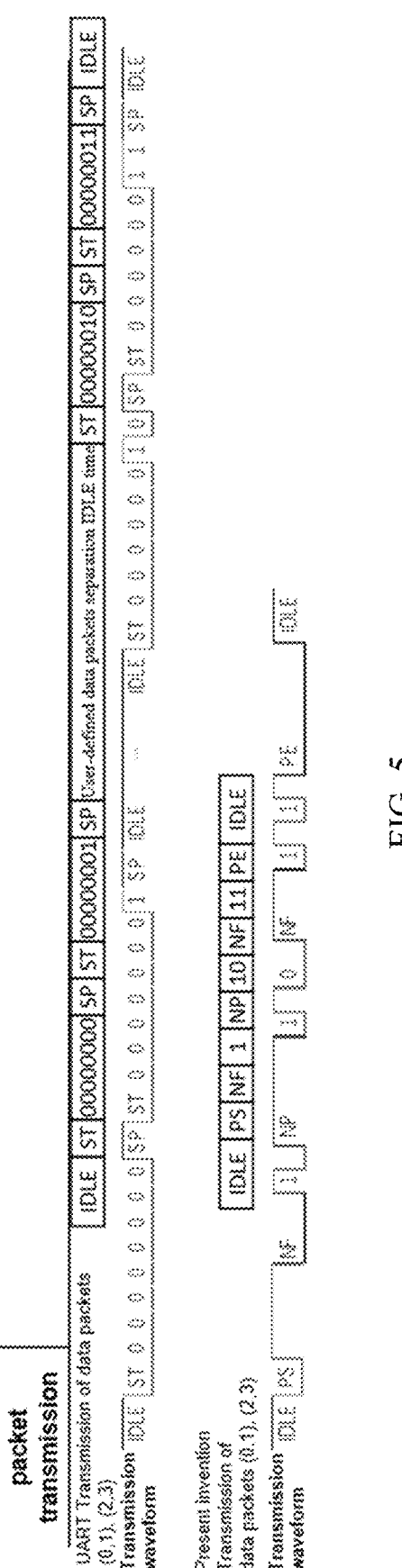
FIG. 5 shows a comparison of examples of multi-packet transmission of the conventional UART serial port and the variable byte length serial port of an embodiment of the present disclosure.

FIG. 5 shows a comparison of examples of multi-packet transmission of the conventional UART serial port and the variable byte length serial port of an embodiment of the present disclosure.

In the example of FIG. 5, UART transmits two data packets continuously, packet 1 contains 2 bytes (0, 1), packet 2 contains 2 bytes (2, 3), the packets are separated by a user-defined idle state with a certain length, usually equal to or longer than the duration of one frame byte, and as such the data packets cannot be transmitted without interruption.

In contrast, the embodiment of the present disclosure transmits two data packets continuously, packet 1 contains 2 bytes (0, 1), packet 2 contains 2 bytes (2, 3), the transmission waveform mixes the frame symbols and the packet symbols, i.e., the start and the end of the transmission transmit the start packet symbol PS and the end packet symbol PE respectively, the separation between packets is represented by an intermediate packet symbol NP, it is not necessary to reserve a certain length of idle state, and the data packets can be transmitted without interruption. For each data packet, the multi-byte example in FIG. 4 can be referred to, i.e., the intermediate frame symbol NF is inserted between the bytes.

Figure 6:
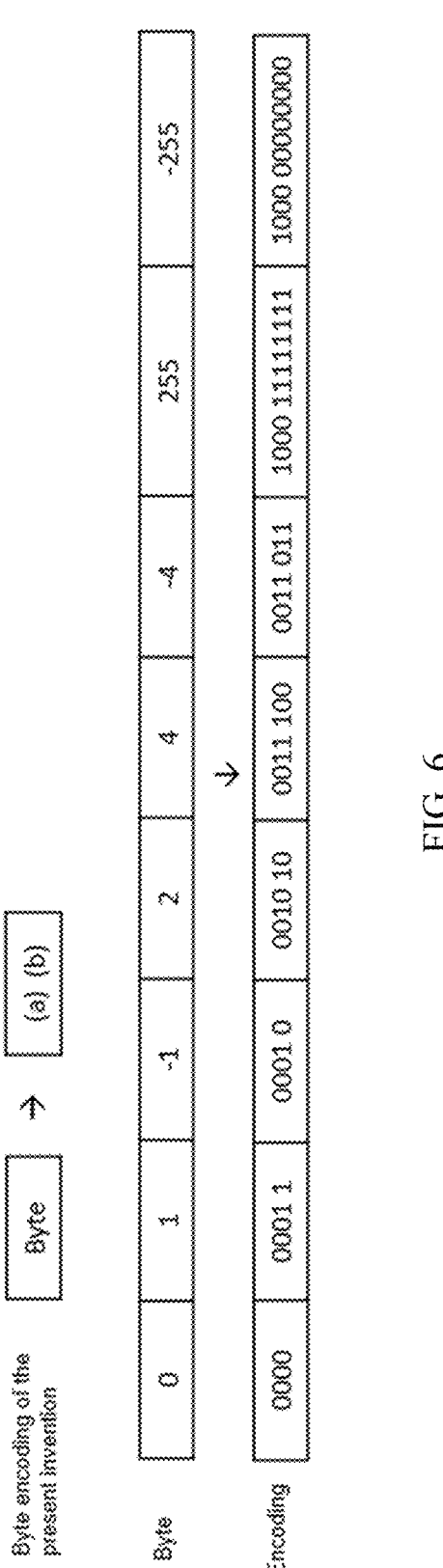
FIG. 6 shows an example of byte encoding of an embodiment of the present disclosure.

FIG. 6 shows an example of byte encoding of an embodiment of the present disclosure. The bytes (8-bit/16-bit/24-bit/32-bit, etc.) transmitted by the variable byte length serial communication system of the embodiment of the present disclosure may be encoded first to facilitate storage and reading of the bytes.

For a byte length of 8-bit, the encoding method is that the numerical value of the first 4 bits (a) represents the number of bits (b) that appear subsequently. For example, for byte 2, part (b) is binary 10, represented by 2 bits, then the bit numerical value of part (a) is 2, i.e., 0010. In another example, for byte −4, part (b) is 011, which is the complement of binary 100 of 4, and is represented by 3 bits, then the bit numerical value of part (a) is 3, i.e., 0011. That is to say, the byte encoding for each byte data includes a first part and a second part following the first part, the second part is the bit representation value of the byte data, the first part has a fixed bit length and its value represents the bit length of the bit representation value in the second part.

The variable byte length serial communication system in the embodiment of the present disclosure reads the byte-encoded data in a serial manner, and transmits the bits of part (b) after decoding.

If the byte length is 16-bit/24-bit, then part (a) requires 5 bits, 32-bit requires 6 bits, 64-bit requires 7 bits, and so on.

FIG. 7 shows an example of compressed transmission of an embodiment of the present disclosure. Taking the data to be transmitted as 2, 9, 254, 9, 200, 254, 9 as an example, the row a in FIG. 7 shows the byte form of a normal transmission mode. It can be seen that, after the idle state (IDLE), the start frame symbol FS first prompts the start of the transmission, then the data are separated by an intermediate frame symbol NF, and 2(10), 9(1001), 254(11111110), 9(1001), 200(11001000), 254(11111110) and 9(1001) are transmitted in sequence, and finally the end frame symbol FE is used to prompt the end of the transmission, and then the idle state is returned. It can be seen that all data to be transmitted require a transmission of 2+4+8+4+8+8+4=38 bits.

In the compressed transmission, as shown by b-d in FIG. 7, it includes the following steps:

1) Generate a "byte-frequency" dictionary: count the number of occurrences of each byte in the data to be transmitted. The above data to be transmitted example can be arranged according to the byte with the highest repeat occurrence frequency as follows: 9(3), 254(2), 2(1), 200(1), where the number in the parentheses represents the number of occurrences of the byte in the data to be transmitted.

Then, the default order can be used to represent the above data in the order starting from the bits with the minimum length, for example: 9(null), 254(0), 2(1), 200(00), where the symbol in the parentheses represents the number of bits required to transmit the byte, for example: null denotes a null bit and represents no bits, 0 denotes one bit of "0", 1 denotes one bit of "1", 00 denotes two bits of "0". That is, according to the number of occurrences, the byte with the highest number of occurrences is denoted by the minimum length (null bit, no bit), the byte with the second highest number of occurrences is denoted by one bit, and so on. That is, the greater the number of occurrences of a byte, the shorter the length of the variable-length byte frame representing the byte.

2) Transmit the "byte-frequency" dictionary: 9(null), 254 (0), 2(1), 200(00). Because the default order is used, only the "byte" part can be transmitted, and it is not necessary to transmit the "frequency" part, including: null, 0, 1, 00, . . . .

It can be seen that 9(1001) is 4 bits, 254(11111110) is 8 bits, 2(10) is 2 bits, and 200(11001000) is 8 bits. That is, 4+8+2+8=22 bits are required to transmit the "byte-frequency" dictionary (see row b in FIG. 7).

254 and 200 can be represented by negative numbers to further reduce the number of bits to be transmitted. That is, ~(256−254)=−2, ~(256−200)=−56.

As mentioned above, byte −2 can be represented by 01, which is the complement of 2(10), i.e., −2 is represented by 2 bits, and byte −56 can be represented by 000111, which is the complement of 56(111000), i.e., −56 is represented by 6 bits. Therefore, the transmission of the "byte-frequency" dictionary can be reduced to only 4+2+2+6=14 bits (see row c in FIG. 7).

3) Transmit the encoded data: 1(2), null(9), 0(254), null (9), 00(200), 0(254), null(9). It should be noted that the data in parentheses is the data before encoding. It is shown here only for the convenience of comparison. Only the data before the parentheses (i.e., the encoded data) will be transmitted. It can be seen that the encoded data 1, null, 0, null, 00, 0, null require 1+0 (null bit is no bit)+1+0+2+1+0=5 bits (see row d in FIG. 7).

4) After receiving the encoded data, the receiver compares it with the "byte-frequency" dictionary and recovers the original data 2, 9, 254, 9, 200, 254, 9 from the received data 1, null, 0, null, 00, 0, null.

It can be seen that when using normal transmission, 38 bits need to be transmitted, and when using the compressed transmission, 14+5 bits (including 14 bits of "byte-frequency" dictionary, and 5 bits of compressed encoded data) need to be transmitted. An excellent compression effect is achieved. In addition, the larger the amount of data to be transmitted, the more the number of repeat occurrences of the byte, and the better the compression effect.

FIG. 8 shows a method of transmitting data via a serial communication line of an embodiment of the present disclosure, the method includes:

generating a signal to be transmitted based on a predetermined serial communication protocol, and transmitting the data through the signal to be transmitted via the serial communication line;

wherein the signal to be transmitted includes a start symbol, an end symbol, and a data frame of the data to be transmitted, the data frame is a variable-length byte frame, for each byte data, if the byte data is a positive numerical value, the variable-length byte frame is generated by omitting all bits 0 before a first bit 1 of the binary equivalent of the positive numerical value.

Figure 9:
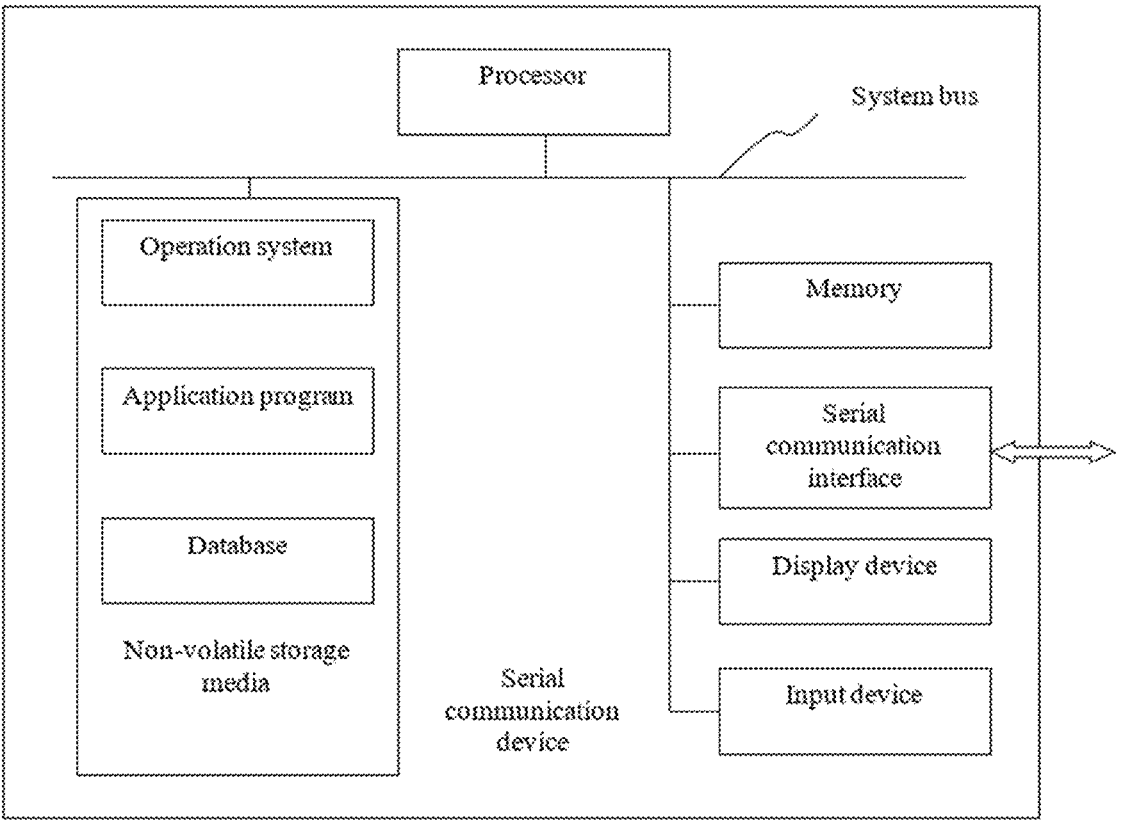
FIG. 9 shows a serial communication device of an embodiment of the present disclosure.

FIG. 9 shows a serial communication device of an embodiment of the present disclosure. The serial communication device may include a serial communication interface, and the serial communication interface may transmit data using the above methods. The serial communication device can be an LCD display driver.

In summary, it can be seen that the variable byte length serial communication system of the embodiments of the present disclosure has the following characteristics:

(1) The transmission granularity is the byte frame, which is formed of frame symbols which are used to delimit the byte frame, and any combination of bit "1" and bit "0". The definition of the byte frame (as shown in FIG. 2) is described above: it starts with a start byte frame symbol (FS) and ends with an end byte frame symbol (FE), it may or may not contain an intermediate byte frame symbol (NF) in the middle, bit "1" and bit "0", which are arbitrarily combined into a byte frame of variable byte length, which can be used to transmit continuous byte frame data. It can be used to transmit continuous byte frames by omitting the unnecessary "0" bits in the high-order of the byte when transmitting the binary bytes, and only transmitting the variable-length bits or null bit of the low-order part of the byte starting with the "1" bit in the byte frame, so as to reduce data transmission of the unnecessary bits.

(2) Byte frames of variable-length bits starting with a "0" bit can be transmitted; this is different from the data byte frame described in item 1, which can express any numerical value, such as a negative number, a command or an address.

(3) The number of occurrences of each byte in an input byte group can be counted first, and then the byte frame with the minimum bits starting with bit "1" and bit "0" as described in items 1 and 2 can be used to represent the most frequently occurring bytes for transmission, thereby compressing the transmission of the byte group.

(4) Byte encoding is performed before transmission via a variable byte length serial communication system (as shown in FIG. 6), It is represented by the arrangement of the first-half bits (a) and the second-half bits (b), the numerical value represented by the fixed number of bits at the front is used to express the number of bits that follow.

(5) The byte encoding with the bit arrangement described in item 4 can be read in, the second-half of the bits (b) can be retrieved, and appropriate frame symbols can be attached for transmission as a complete byte frame.

(6) Data packet symbols are also defined, including a start data packet symbol (PS), an end data packet symbol (PE), and an intermediate data packet symbol (NP); the data packet definition (as shown in FIG. 2) is as follows: it starts with a start data packet symbol (PS), ends with an end data packet symbol (PE), it may or may not contain an intermediate data packet symbol (NP) in the middle, an intermediate byte frame symbol (NF), bit "1" and bit "0", which are arbitrarily combined into a data packet of variable byte length, and can be used to transmit continuous data packets.

(7) The sender can specify the transmission mode as byte frame mode or data packet mode by the start byte frame symbol (FS) or the start data packet symbol (PS); the receiver can detect the transmission mode from the received start byte frame symbol (FS) or the start data packet symbol (PS) and automatically switch to a transmission mode consistent with the sender.

(8) The sender can also specify the transmission rate from the start byte frame symbol (FS) or the start data packet symbol (PS); the receiver can detect the transmission rate from the received start byte frame symbol (FS) or the start data packet symbol (PS), and automatically switch to a transmission rate consistent with the sender.

(9) Single-line communication can be adopted, with BMC (Biphase Mark Coding) encoding, its symbols are composed of different pulse widths (as shown in FIG. 2), which are unique symbols in byte frame mode or data packet mode; with a minimum pulse width of 1T, then the symbols can be defined as follows: the pulse width of bit "1" is 1T1T, and the pulse width of bit "0" is 2T; in byte frame mode, the pulse width of the symbol FS is 1T3T, the pulse width of the symbol NF is 3T, and the pulse width of the symbol FE is 4T; in data packet mode, the pulse width of the symbol PS is 1T4T, the pulse width of the symbol NF is 3T, the pulse width of the symbol NP is 4T, and the pulse width of the symbol PE is 5T.

(10) A single-line serial communication system can be combined into a multi-line serial communication system. The input byte group can be assigned to the multi-line serial communication system and sent in parallel to increase the transmission speed, the receiving end combines the received bytes to recover the byte group.

(11) The state after the byte frame symbol FE or the data packet symbol PE ends is the IDLE state, its communication line is at a high level, and it is maintained until the start of the next byte frame symbol FS or data packet symbol PS.

The present disclosure has the following advantages:

1. It can transmit variable length data byte frames, omit unnecessary "0" bits, and reduce transmission time;

2. It can mix byte frames of positive and negative numerical data/command/address, and transmit them without interruption within a specified byte length, thus improving the transmission efficiency;

3. It can continuously transmit byte frames and data packets, thereby reducing the pause time between data packets.

The above embodiments are only used to illustrate the technical solutions of the present invention, rather than to limit them; although the present invention has been described in detail with reference to the aforementioned embodiments, those of ordinary skill in the art should understand that they can still modify the technical solutions described in the aforementioned embodiments, or replace some of the technical features therein by equivalents; and these modifications or replacements do not make the essence of the corresponding technical solutions deviate from the scope of the technical solutions in the embodiments of the present invention. For those of ordinary skill in the art, various modifications and improvements made without departing from the concept of the present application are within the scope of protection of the present application. Therefore, the scope of protection of the present application for patent shall be subject to the attached claims.

What is claimed is:

1. A method of transmitting data via a serial communication line, comprising:

generating a signal to be transmitted based on a predetermined serial communication protocol, and transmitting the data through the signal to be transmitted via the serial communication line;

wherein the signal to be transmitted comprises a start symbol, an end symbol, and a data frame of the data to be transmitted, the data frame is a variable-length byte frame, for each byte data, if the byte data is a positive numerical value, the variable-length byte frame is generated by omitting all bits 0 before a first bit 1 of a binary equivalent of the positive numerical value.

2. The method according to claim 1, wherein, if the byte data is 0, the variable-length byte frame is a null bit; if the byte data is a negative numerical value, the variable-length byte frame is obtained by inverting each bit of the variable-length byte frame of the positive numerical value that corresponds to the negative numerical value.

3. The method according to claim 2, further comprising: when transmitting continuous byte data, inserting an intermediate frame symbol between two adjacent variable-length byte frames corresponding to the byte data.

4. The method according to claim 2, further comprising:

counting a number of occurrences of each byte in an input byte group, according to a predefined principle, transmitting each byte in the input byte group represented by the variable-length byte frame, wherein the predefined principle is that the greater the number of occurrences of the byte, the shorter a length of the variable-length byte frame that represents the byte.

5. A serial communication device, comprising a serial communication interface, the serial communication interface transmits data using the method of claim 2.

6. The method according to claim 3, wherein, the start symbol comprises a start frame symbol and a start packet symbol, the end symbol comprises an end frame symbol and an end packet symbol, the signal to be transmitted is transmitted in a frame transmission mode or a packet transmission mode based on the start frame symbol and the start packet symbol respectively.

7. A serial communication device, comprising a serial communication interface, the serial communication interface transmits data using the method of claim 3.

8. The method according to claim 6, further comprising: when transmitting continuous data packets, inserting an intermediate packet symbol between two adjacent data packets.

9. A serial communication device, comprising a serial communication interface, the serial communication interface transmits data using the method of claim 6.

10. The method according to claim 8, wherein, based on the predetermined serial communication protocol, a transmission waveform of bit 1 is bi-level, each level with a pulse width of one unit, and a transmission waveform of bit 0 is single-level with a pulse width of two units, a transmission waveform of the start frame symbol is bi-level with a pulse width of one unit and a pulse width of three units respectively, a transmission waveform of the intermediate frame symbol is single-level with a pulse width of three units, a transmission waveform of the end frame symbol is single-level with a pulse width of four units, a transmission waveform of the start packet symbol is bi-level with a pulse width of one unit and a pulse width of four units respectively, a transmission waveform of the intermediate packet symbol is single-level with a pulse width of four units, and a transmission waveform of the end packet symbol is single-level with a pulse width of five units.

11. A serial communication device, comprising a serial communication interface, the serial communication interface transmits data using the method of claim 8.

12. A serial communication device, comprising a serial communication interface, the serial communication interface transmits data using the method of claim 10.

13. A serial communication device, comprising a serial communication interface, the serial communication interface transmits data using the method of claim 4.

14. The method according to claim 1, wherein, the serial communication line comprises a plurality of serial communication lines, the data to be transmitted are assigned to the plurality of serial communication lines and sent in parallel.

15. A serial communication device, comprising a serial communication interface, the serial communication interface transmits data using the method of claim 14.

16. The method according to claim 1, further comprising: performing byte encoding on each byte data, wherein the byte encoding comprises a first part and a second part following the first part, the second part is a bit representation value of the byte data, the first part has a fixed bit length, and a value of the first part represents a bit length of the bit representation value in the second part.

17. A serial communication device, comprising a serial communication interface, the serial communication interface transmits data using the method of claim 16.

18. A serial communication device, comprising a serial communication interface, the serial communication interface transmits data using the method of claim 1.

* * * * *